United States Patent
Hall

(10) Patent No.: US 8,862,856 B2
(45) Date of Patent: Oct. 14, 2014

(54) IMPLEMENTING REMAPPING COMMAND WITH INDIRECTION UPDATE FOR INDIRECTED STORAGE

(75) Inventor: David Robison Hall, Rochester, MN (US)

(73) Assignee: HGST Netherlands B.V., Amsterdam (NL)

(*) Notice: Subject to any disclaimer, the term of this patent is extended or adjusted under 35 U.S.C. 154(b) by 257 days.

(21) Appl. No.: 13/442,419

(22) Filed: Apr. 9, 2012

(65) Prior Publication Data
US 2013/0268718 A1    Oct. 10, 2013

(51) Int. Cl.
*G06F 12/00* (2006.01)
(52) U.S. Cl.
USPC .............. 711/202; 711/103; 711/E12.008
(58) Field of Classification Search
USPC ................... 711/103, 202, E12.008
See application file for complete search history.

(56) References Cited

U.S. PATENT DOCUMENTS

| 7,418,645 | B2 | 8/2008 | Srivastava |
| 2003/0163756 | A1* | 8/2003 | George ............ 714/5 |

OTHER PUBLICATIONS

TCG Storage Security Subsystem Class: Opal, Specification Version 1.00 Revision 3.00, Feb. 4, 2010.

* cited by examiner

*Primary Examiner* — Midys Rojas
(74) *Attorney, Agent, or Firm* — Joan Pennington

(57) ABSTRACT

A method, apparatus, and a storage system are provided for implementing enhanced indirection update for indirected storage devices. A novel remapping command generated by a host is used to store indirection data. The remapping command enables remapping of a set of Logical Block Addresses (LBAs) to a different set of LBAs. The remapping command includes a source LBA, length and a destination LBA.

20 Claims, 6 Drawing Sheets

REMAPPING COMMAND
200

| SOURCE LBA 202 | LENGTH 204 | DESTINATION LBA 206 |

FIG. 2A

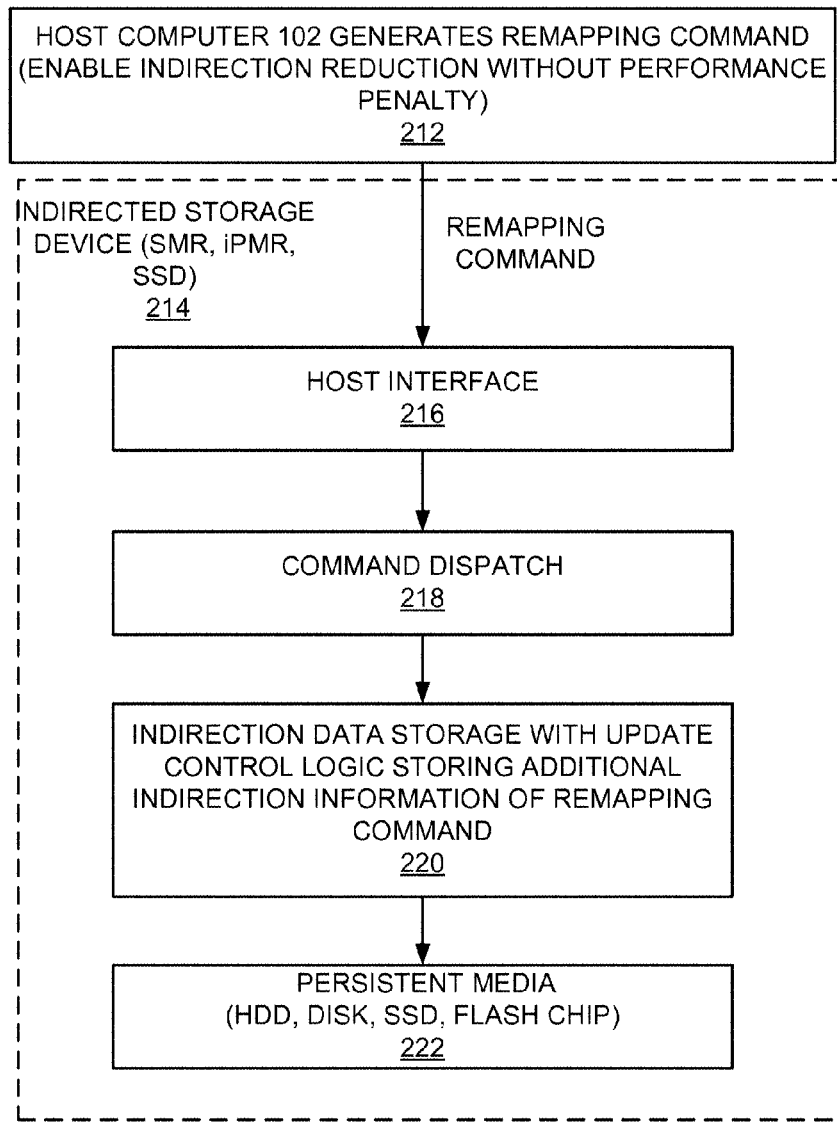

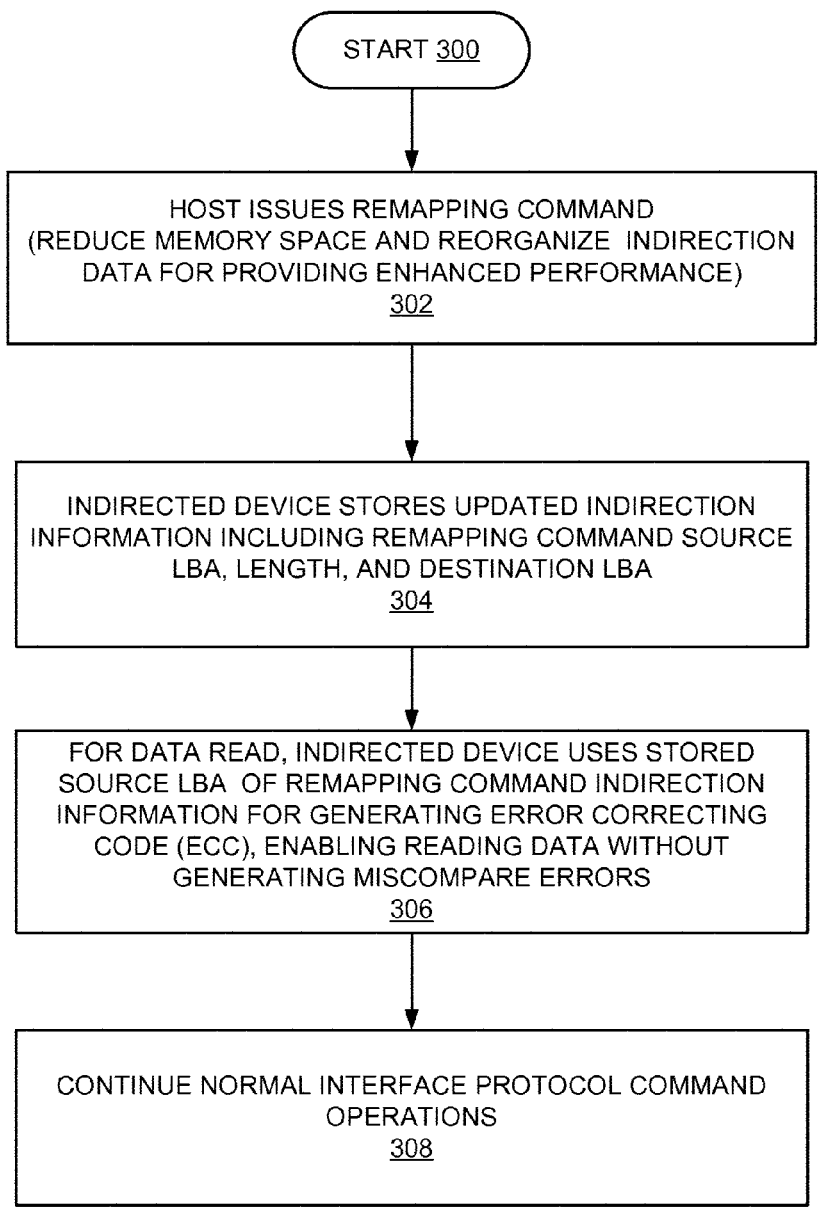

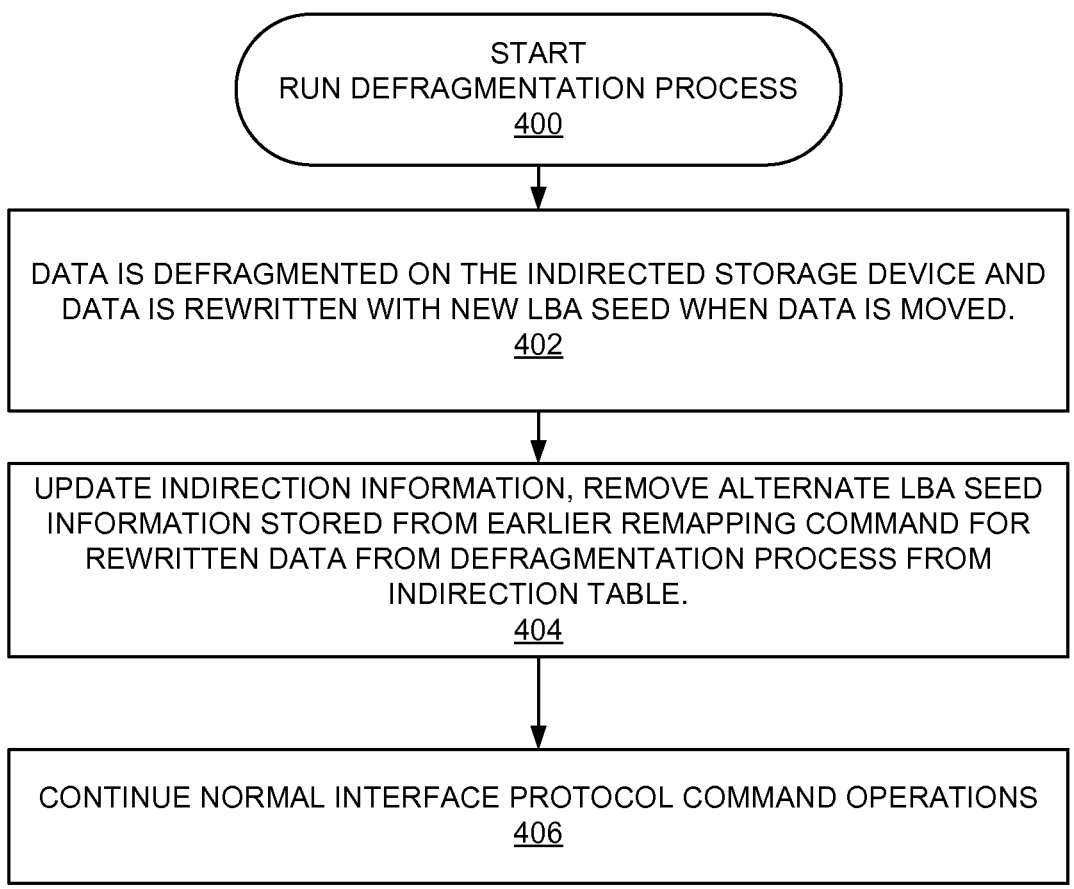

IMPLEMENTING REMAPPING COMMAND WITH INDIRECTION UPDATE FOR INDIRECTED STORAGE

FIELD OF THE INVENTION

The present invention relates generally to the data storage field, and more particularly, relates to a method and apparatus for implementing indirection update for indirected storage devices, for example, for solid state drives (SSDs), for shingled perpendicular magnetic recording (SMR) in a Shingled Disk Drives (SDDs), and for an indirection perpendicular magnetic recording (iPMR) disk drives.

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs), and advantageously includes SDDs to achieve high track density.

A Shingled Disk Drive (SDD) is a hard disk drive recording magnetic patterns of data on a writable disk surface in overlapping circular tracks using shingled magnetic recording (SMR) to achieve higher track density than conventional perpendicular magnetic recording (PMR).

Mass storage systems must map host logical block addresses (LBAs) to physical locations on the media. Indirection systems for host to physical mapping exist at multiple levels within a data storage system. The host is usually responsible for the file system, a large indirected space. Host systems will move data without changing the data for one of two purposes; 1) to improve performance; and 2) to reduce meta data storage requirements. Windows disk defragmentation is one example.

With the advent of indirected storage devices including SSD, SMR, iPMR, drives have their own indirection system and non-trivial LBA to physical mappings. Optimizing performance in the storage device may negate the effect of a host system's defragmentation operation. Defragging may also cause significant performance problems for SMR devices, as the ability to write data in place is compromised. Currently host operating systems are beginning to treat indirected devices differently with respect to defragmentation, reducing their ability to optimize performance and their own indirection storage requirements.

U.S. Ser. No. 12/797,683 filed Jun. 10, 2010 entitled IMPLEMENTING ENHANCED STORAGE MAPPING WITH COMPOSITION INDIRECTION FOR PERSISTENT MEDIA INCLUDING SOLID STATE DRIVES, by the present inventor, David Robison Hall, discloses a method and storage system for implementing host to physical mapping for persistent media including flash memory. Numerical compositions at multiple granularities are used to store the host to physical mappings. A plurality of groupings, each grouping including a fixed number of blocks is encoded using recursive composition, eliminating the need to store separate lengths.

A need exists for an effective and efficient mechanism to implement indirection update for indirected storage devices to allow for the indirection storage reduction without the device performance penalty.

SUMMARY OF THE INVENTION

Aspects of the present invention are to provide a method, apparatus, and a storage system for implementing indirection update for indirected storage devices, for example, for solid state drives (SSDs), for shingled perpendicular magnetic recording (SMR) in a Shingled Disk Drives (SDDs), and for an indirection perpendicular magnetic recording (iPMR) disk drives. Other important aspects of the present invention are to provide such method, apparatus, and storage system substantially without negative effect and to overcome some of the disadvantages of prior art arrangements.

In brief, a method, apparatus, and a storage system are provided for implementing enhanced indirection update for indirected storage devices. A novel remapping command generated by a host is used to store indirection data. The remapping command enables remapping of a set of Logical Block Addresses (LBAs) to a different set of LBAs. The remapping command includes a source LBA, length and a destination LBA.

BRIEF DESCRIPTION OF THE DRAWINGS

The present invention together with the above and other objects and advantages may best be understood from the following detailed description of the embodiments of the invention illustrated in the drawings, wherein:

FIG. 2A illustrates a novel remapping command generated by a host and used to store indirection data accordance with an embodiment of the invention;

FIG. 2B schematically illustrates interface protocol operations with the new remapping command in accordance with an embodiment of the invention;

FIGS. 3, and 4 are flow charts illustrating example operations of the system of FIG. 1 for implementing enhanced indirection update for indirected storage devices to allow for the indirection storage reduction without a device performance penalty in accordance with embodiments of the invention.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, methods and a storage system are provided for implementing indirection update for indirected storage devices to allow for the indirection reduction without the device performance penalty.

Figure 1:
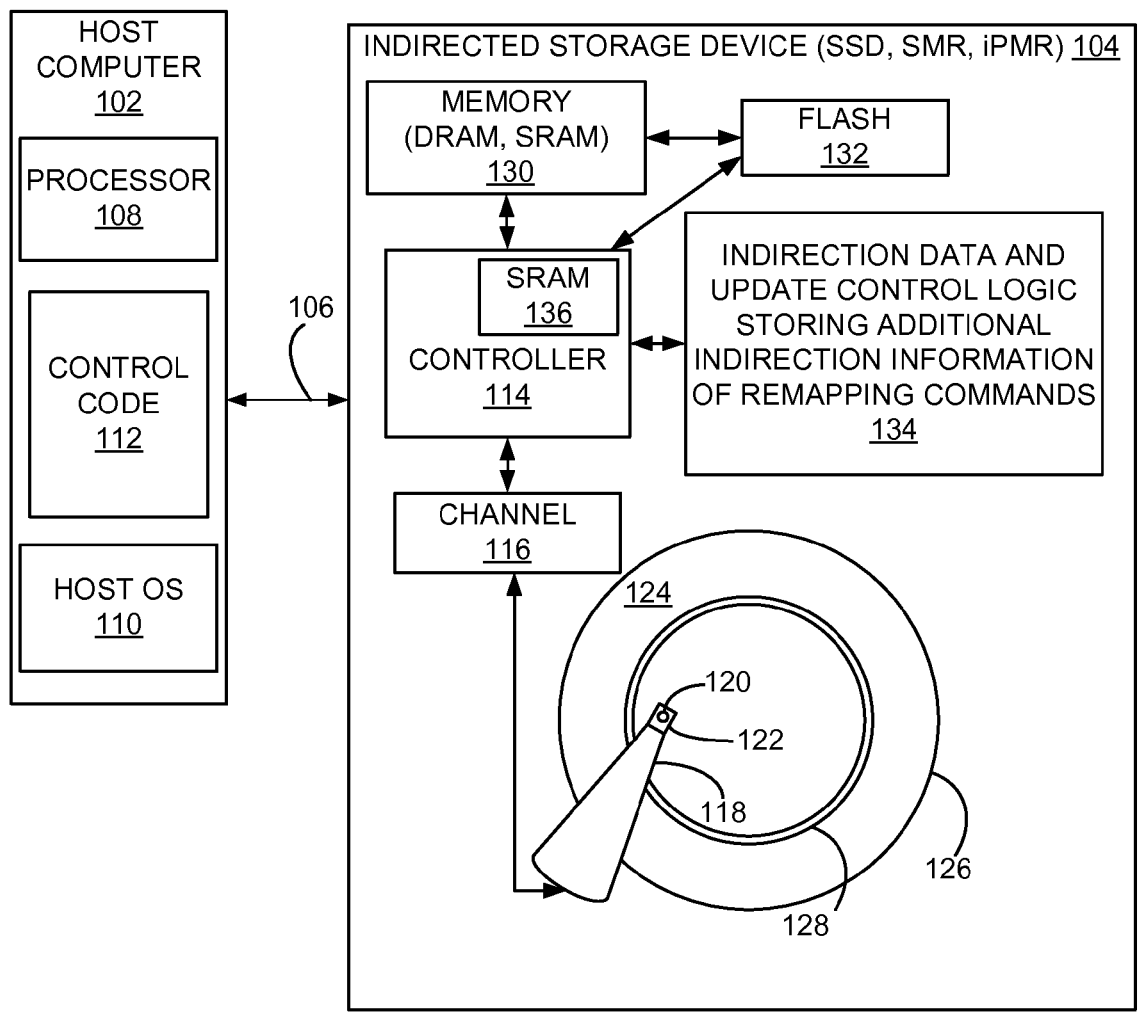
FIG. 1 is a block diagram representation of a storage system for implementing enhanced indirection update for indirected storage devices in accordance with an embodiment of the invention.

Having reference now to the drawings, in FIG. 1, there is shown an example system generally designated by the reference character 100 for implementing indirection update for indirected storage devices to allow for the indirection reduction substantially without device performance penalty in accordance with an embodiment of the invention. System 100 includes a host computer 102, an indirected storage device 104, such as a SSD, SMR, iPMR 104, and an interface 106 between the host computer 102 and the storage device 104.

As shown in FIG. 1, host computer 102 includes a processor 108, a host operating system 110, and control code 112. The indirected storage device or hard disk drive 104 includes a controller 114 coupled to a data channel 116. The storage device or hard disk drive 104 includes an arm 118 carrying a read/write head including a read element 120, and a write element 122.

In operation, host operating system 110 in host computer 102 sends commands and data to be written to hard disk drive 104. In response to the commands, hard disk drive 104 performs requested functions such as reading data, writing data, erasing data, and the like, on disk surface 124. The write element 122 writes magnetic patterns of data on a recordable or writable surface 124 of a disk 126. Controller circuit 114 causes write element 122 to record magnetic patterns of data on a writable surface of disk 122 in overlapping circular tracks 128 using shingled writing, such as, shingled perpendicular magnetic recording (SMR) for example, to achieve high track density.

Hard disk drive or SDD 104 includes a dynamic random access memory (DRAM) and/or a static random access memory (SRAM) 130 coupled to the controller 114 and a flash memory 132.

In accordance with features of the embodiments of the invention, host operating system 110 in host computer 102 sends remapping commands, for example, as illustrated and described with respect to FIG. 2A. The remapping command generated by a host is used to store updated indirection data. The remapping command enables remapping of a set of Logical Block Addresses (LBAs) to a different set of LBAs. The remapping command includes a source LBA, length and a destination LBA.

In accordance with features of the embodiments of the invention, the controller 114 is coupled to an indirection data and update control logic storing additional indirection information of remapping commands 134 in accordance with the invention. Hard disk drive or SDD 104 includes a SRAM 136, for example, storing a pointer to metadata stored on the disk 126, the indirection data and update control logic 134 and or in the flash memory 132.

Controller 114 can include various implementations, for example, fabricated with one or multiple integrated circuit dies. A digital video recorder (DVR), a set-top-box (STB), or various other computer system types are specific implementation of a host computer 102. While the control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

The present invention advantageously is used with various indirected storage devices, such as, a shingled perpendicular magnetic recording (SMR) Shingled Disk Drive (SDD), and an indirection perpendicular magnetic recording (iPMR) disk drives, and Solid State Drives (SSDs).

System 100 including the host computer 102 and the illustrated indirected storage device, hard disk drive or SDD 104 is shown in simplified form sufficient for understanding the present invention. The illustrated host computer 102 together with the storage device or SDD 104 is not intended to imply architectural or functional limitations. The present invention can be used with various hardware implementations and systems and various other internal hardware devices.

Referring to FIG. 2A there is shown an example novel remapping command generally designated by the reference character 200 generated by a host computer 102 and used to store indirection data accordance with an embodiment of the invention.

The remapping command 200 enables remapping of a first set of original or source Logical Block Addresses (LBAs) to a different set of destination LBAs. The remapping command includes a source LBA 202, length 204 and a destination LBA 106.

Referring to FIG. 2B there are schematically shown interface protocol operations with the new remapping command generally designated by the reference character 210 in accordance with an embodiment of the invention. As indicated at a block 212, the host computer 102 generates the remapping command, for example, to enable indirection reduction without a performance penalty. Indirected storage device generally designated by the reference character 214, such as SMR, iPMR, SSD is coupled to the host computer 102. A host interface 216 of the indirected storage device 214 receives the remapping command. A command dispatch block 218 coupled to the host interface 216 provides the remapping command to the indirection data storage with update control logic for storing additional indirection information of the remapping command as indicated at block 220. Persistent media as indicated at a block 222, such as HDD, disk, SSD, flash chip, for storing data is coupled to the indirection data storage with update control logic 220.

FIGS. 3 and 4 are flow charts illustrating example operations of the system of FIG. 1 for implementing enhanced indirection update for indirected storage devices to allow for the indirection storage reduction without a device performance penalty in accordance with embodiments of the invention.

In accordance with features of the embodiments of the invention, the new remapping command of the invention allows reduction of the indirection data without physically moving the associated data so that no performance penalty results. The associated data optionally could be physically moved but is not required.

Referring to FIG. 3, operations of the system 100 for implementing enhanced indirection update for indirected storage devices to allow for the indirection storage reduction without a device performance penalty start as indicated at a block 300.

As indicated at a block 302, the host issues a remapping command, for example, to reduce memory space and reorganize indirection data for providing enhanced performance. The indirected device 104 stores updated indirection information including command source LBA, length, and destination LBA of the remapping command as indicated at a block 304.

As indicated at a block 306, for a data read, indirected device uses the stored source LBA of the remapping command indirection information for generating error correction code (ECC), enabling reading data without generating miscompare errors. The stored source LBA of the remapping command indirection information used at lock 306 provides the LBA seed as used during the initial write of data to the disk. As indicated at a block 308, normal interface protocol command operations continue.

In accordance with features of the embodiments of the invention, the system 100 optionally performs a defragmentation process including the rewriting of data, for example, to a sequential form to free contiguous sections of drive space.

Referring to FIG. 4, operations of the system 100 for implementing a defragmentation process start as indicated at a block 400. As indicated at a block 402, data is defragmented on the indirected storage device, and data is rewritten with a new LBA seed when the data is moved. Indirection information is updated, and the alternate LBA seed information stored for earlier remapping command for the rewritten data from the defragmentation process is removed from the indirection table as indicated at a block 404. As indicated at a block 406, normal interface protocol command operations continue.

Figure 5:
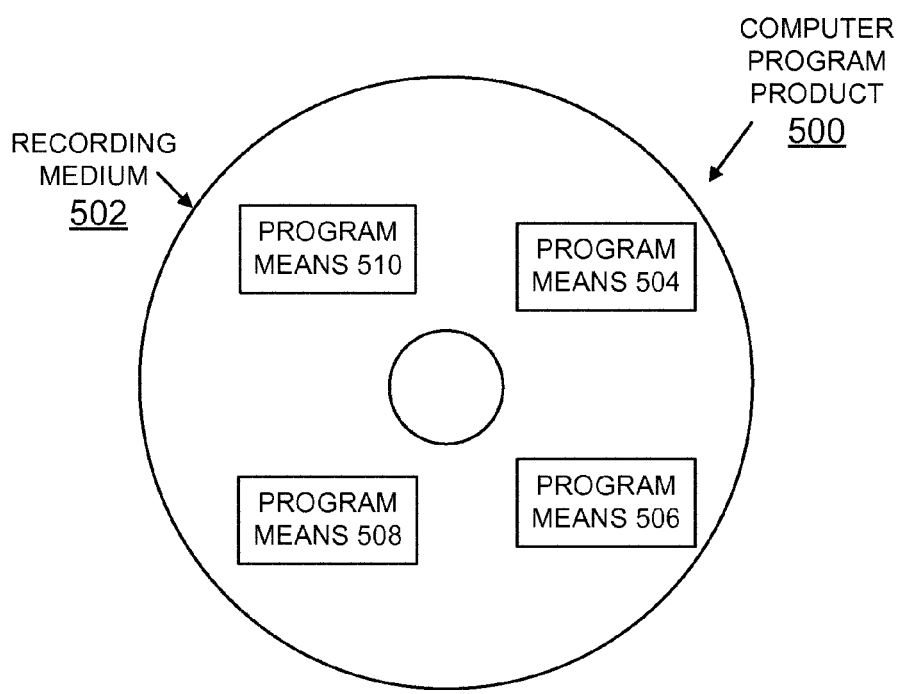
FIG. 5 is a block diagram illustrating a computer program product in accordance with embodiments of the invention.

Referring now to FIG. 5, an article of manufacture or a computer program product 500 of the invention is illustrated. The computer program product 500 includes a computer readable recording medium 502, such as, a floppy disk, a high capacity read only memory in the form of an optically read compact disk or CD-ROM, a tape, or another similar computer program product. Computer readable recording medium 502 stores program means or control code 504, 506, 508, 510 on the medium 502 for carrying out the methods for implementing enhanced indirection updates for indirected storage devices of the embodiments of the invention in the system 100 of FIG. 1.

A sequence of program instructions or a logical assembly of one or more interrelated modules defined by the recorded program means or control code 504, 506, 508, 510, direct the system 100 for implementing indirection update methods of the embodiments of the invention.

While the present invention has been described with reference to the details of the embodiments of the invention shown in the drawing, these details are not intended to limit the scope of the invention as claimed in the appended claims.

What is claimed is:

1. A method for implementing indirection update for indirected storage devices comprising:
   generating a remapping command by a host to store indirection data; said remapping command providing updated indirection data without requiring physically moving associated data with said indirection data; and
   using said remapping command for remapping of a set of Logical Block Addresses (LBAs) to a different set of LBAs; said updated indirection data of said remapping command including a source LBA, length and a destination LBA.

2. The method as recited in claim 1 includes implementing indirection update for indirected storage devices including at least one of a solid state drive (SSD), a shingled perpendicular magnetic recording (SMR) Shingled Disk Drive (SDD), and an indirection perpendicular magnetic recording (iPMR) disk drive.

3. The method as recited in claim 1 wherein generating said remapping command by the host to store indirection data includes generating said remapping command for reducing memory space of indirection data.

4. The method as recited in claim 1 wherein generating said remapping command by the host to store indirection data includes generating said remapping command for providing enhanced performance.

5. The method as recited in claim 1 includes storing said updated indirection information in the indirected device responsive to said remapping command including a source LBA, length and said destination LBA.

6. The method as recited in claim 1 includes storing said source LBA, said length, and said destination LBA of said remapping command in the indirected device.

7. The method as recited in claim 6 includes using said source LBA for generating error correcting code (ECC) to enable reading data from the indirected device without generating miscompare errors.

8. The method as recited in claim 6 includes performing a defragmentation process and removing said stored destination LBA with said source LBA, length of said remapping command for data rewritten during the defragmentation process in the indirected device.

9. The method as recited in claim 8 wherein generating said remapping command and using said remapping command is performed before performing the defragmentation process for providing an enhanced efficiency defragmentation process in the indirected device.

10. The method as recited in claim 1 wherein generating said remapping command by the host to store indirection data includes storing said source LBA, said length and said destination LBA of said remapping command in the indirected device without physically moving written data.

11. An apparatus for implementing indirection update for indirected storage devices comprising:
    a remapping command generated by a host to store indirection data; said remapping command providing updated indirection data without requiring physically moving associated data with said indirection data; and
    said remapping command being used for remapping of a set of Logical Block Addresses (LBAs) to a different set of LBAs; said updated indirection data of said remapping command including a source LBA, length and a destination LBA.

12. The apparatus as recited in claim 11 wherein the indirected storage devices includes at least one of a solid state drive (SSD), a shingled perpendicular magnetic recording (SMR) Shingled Disk Drive (SDD), and an indirection perpendicular magnetic recording (iPMR) disk drive.

13. The apparatus as recited in claim 11 includes a controller, and indirection memory update control logic coupled to said controller for storing indirection data of said remapping command including said source LBA, said length and said destination LBA.

14. The apparatus as recited in claim 13 includes said controller generating said remapping command for reducing memory space of indirection data.

15. The apparatus as recited in claim 13 includes said controller responsive to performing a defragmentation process, removing said stored destination LBA with said source LBA, and length of said remapping command for data rewritten during the defragmentation process in the indirected device.

16. The apparatus as recited in claim 13 includes said controller using said source LBA for generating error correcting code (ECC) to enable reading data from the indirected device without generating miscompare errors.

17. The apparatus as recited in claim 11 includes indirection memory storing said source LBA, said length, and said destination LBA of said remapping command without physically moving written data in the indirected device.

18. A data storage system comprising:
    an indirected storage device;
    a host computer generating a remapping command to implement indirection update for indirected storage devices; said remapping command providing updated indirection data without requiring physically moving associated data with said indirection data; said remapping command being used for remapping of a set of Logical Block Addresses (LBAs) to a different set of LBAs; said updated indirection data of said remapping command including a source LBA, length and a destination LBA; and indirection memory storing said source LBA, said length, and said destination LBA of said remapping command without physically moving written data in the indirected storage device.

19. The data storage system as recited in claim 18 includes a controller using said source LBA for generating error correcting code (ECC) to enable reading data from the indirected device without generating miscompare errors.

20. The data storage system as recited in claim 18 includes said controller, and indirection memory update control logic coupled to said controller for storing indirection data of said remapping command including said source LBA, said length and said destination LBA stored in said indirection memory.

* * * * *